(12) United States Patent
Lischinski

(10) Patent No.: US 9,327,909 B2
(45) Date of Patent: May 3, 2016

(54) INSTALLATION FOR CONVEYING PRODUCTS

(71) Applicant: Weber Machinebau GmbH Breidenbach, Breidenbach (DE)

(72) Inventor: Gerd Lischinski, Breidenbach (DE)

(73) Assignee: WEBER MASCHINENBAU GMBH BREIDENBACH (DE)

( * ) Notice: Subject to any disclaimer, the term of this patent is extended or adjusted under 35 U.S.C. 154(b) by 237 days.

(21) Appl. No.: 13/755,459

(22) Filed: Jan. 31, 2013

(65) Prior Publication Data

US 2013/0192955 A1    Aug. 1, 2013

(30) Foreign Application Priority Data

Jan. 31, 2012    (DE) .................... 10 2012 001 770

(51) Int. Cl.
| | |
|---|---|
| B65G 43/08 | (2006.01) |
| B65G 47/96 | (2006.01) |
| B65G 47/94 | (2006.01) |

(52) U.S. Cl.
CPC ............... *B65G 43/08* (2013.01); *B65G 47/96* (2013.01)

(58) Field of Classification Search
None
See application file for complete search history.

(56) References Cited

U.S. PATENT DOCUMENTS

| | | | | |
|---|---|---|---|---|
| 3,717,087 A | * | 2/1973 | Amori ................. | B26D 7/0641 99/538 |
| 5,387,260 A | * | 2/1995 | Gennari ............... | B65G 17/345 198/798 |
| 5,857,555 A | | 1/1999 | Maier et al. | |
| 6,039,171 A | * | 3/2000 | Trieb ..................... | B61B 7/00 198/699 |
| 6,152,280 A | | 11/2000 | Bruun | |
| 6,708,813 B2 | * | 3/2004 | Takahashi ............ | B65G 47/647 198/369.2 |
| 6,736,254 B1 | | 5/2004 | Fortenbery et al. | |
| 7,128,217 B2 | * | 10/2006 | Henry ................... | A21C 15/00 198/418.7 |
| 2005/0274589 A1 | | 12/2005 | Groot et al. | |
| 2008/0185267 A1 | | 8/2008 | Benedetti | |

FOREIGN PATENT DOCUMENTS

| | | |
|---|---|---|
| DE | 2260718 | 7/1973 |
| DE | 4220117 A1 | 2/1993 |
| DE | 19835322 A1 * | 2/2000 |
| DE | 202006011139 U1 | 10/2006 |

OTHER PUBLICATIONS

German Search Report; Application No. DE 10 2012 001 770.7; Filing Date: Jan. 31, 2012; Date of Mailing: Sep. 11, 2012; 5 pages.
English Translation of German Search Report; German Application No. DE 10 2012 001 770.7; Filing Date: Jan. 31, 2012; Mailing Date: Sep. 11, 2012; 6 pages.
English Translation of European Search Report Relating to European Patent Application No. 12197113.9; dated May 16, 2013; 4 pages.

\* cited by examiner

*Primary Examiner* — Kavel Singh
(74) *Attorney, Agent, or Firm* — Cantor Colburn LLP

(57) ABSTRACT

The invention relates to an installation for conveying products, in particular product slices or product portions combing from a slicing machine for food products, having at least one conveyor which includes a carrier and at least one conveyor section held at the carrier, wherein at least a part of the conveyor section is tiltable relative to the carrier between a conveying position and a safety position about an axis extending in the conveying direction.

20 Claims, 7 Drawing Sheets

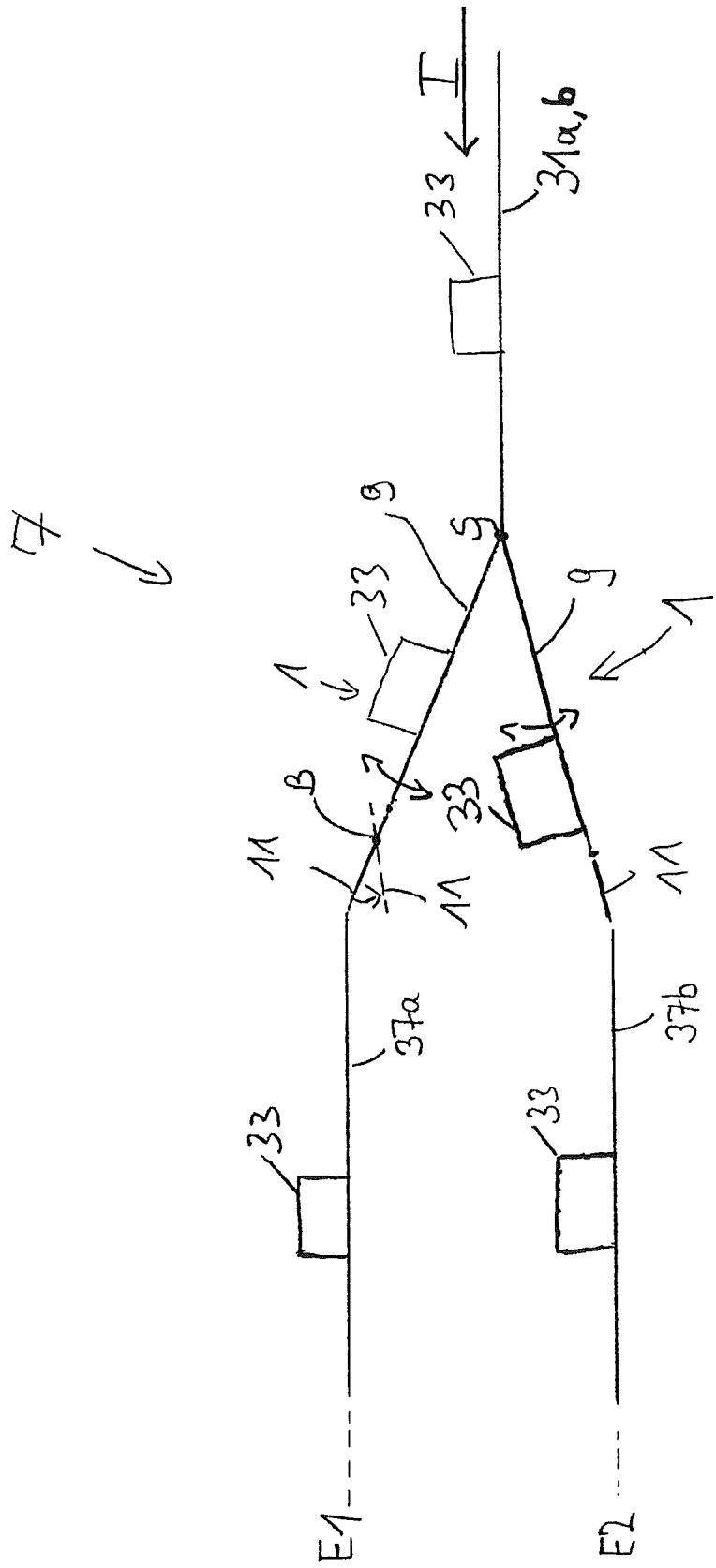

INSTALLATION FOR CONVEYING PRODUCTS

CROSS-REFERENCES TO RELATED APPLICATIONS

Figure 1:
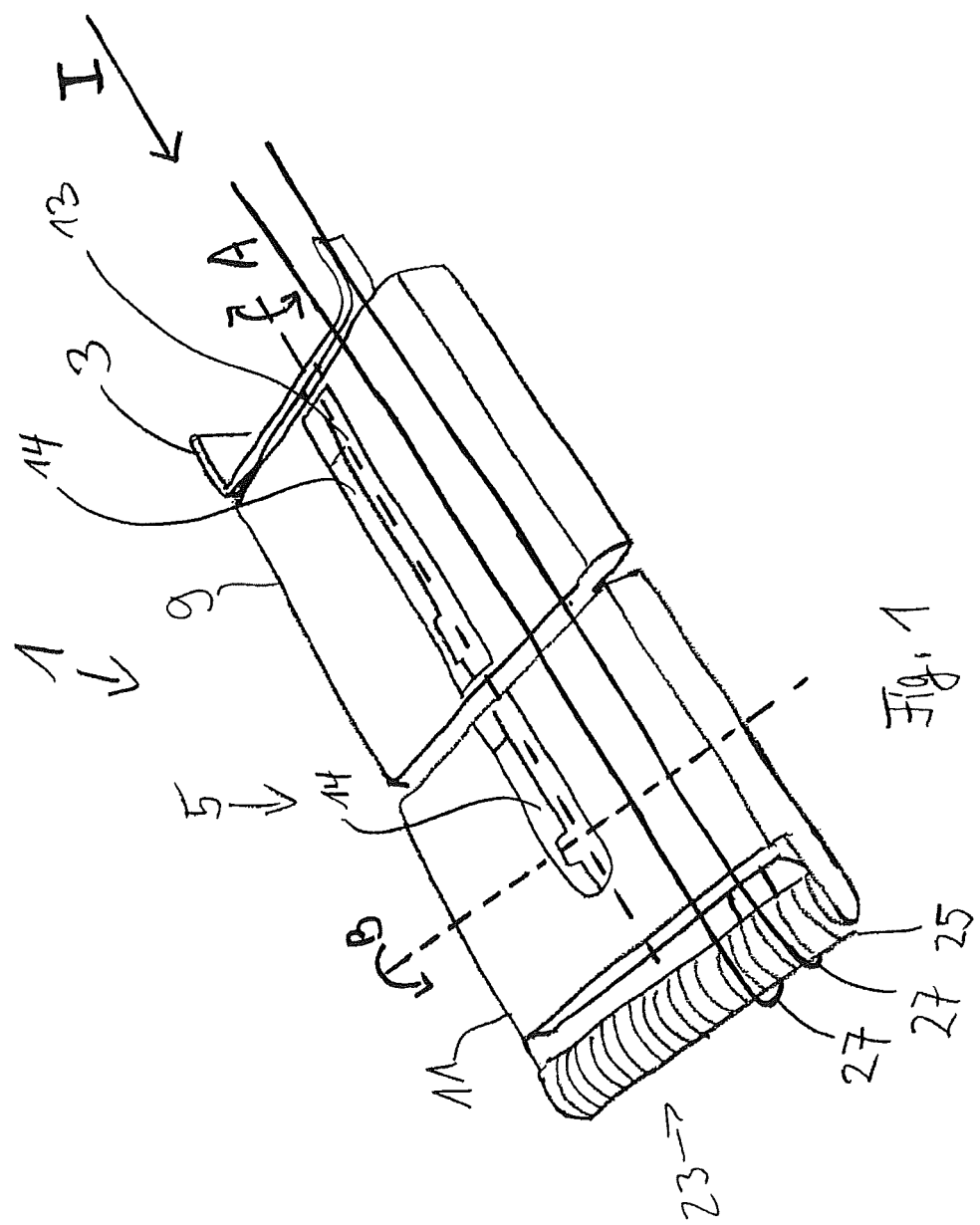

This patent application claims the benefit of priority to German Patent Application Serial No. 102012001770.7, filed Jan. 31, 2012 which is incorporated herein by reference in its entirety.

The present invention relates to an installation for conveying products, in particular product slices or product portions coming from a slicing machine for food products.

Conveying plants for transporting products by means of conveyor belts or the like are known per se. Such conveying plants can, for example, have an ingoing conveyor and a plurality of outgoing conveyors downstream of the ingoing conveyor and lying above one another, It is known to provide a conveyor serving as a distributor at the front—viewed in the conveying direction—end of the ingoing conveyor in the manner of a rocker so that the conveyor is pivotable to supply products which run in via the ingoing conveyor to one of the downstream outgoing conveyors in dependence on the pivot position of the conveyor. Since the conveyor forms a component in the conveying plant which is movable, because it is pivotable, high safety demands must be made on the conveyor and on the conveying plant.

It is the object of the present invention to provide an installation for conveying products which has been improved with respect to the safety demands.

The object is satisfied by an installation having the features of claim 1.

A conveying installation of the initially named kind includes, in accordance with the invention, at least one conveyor which includes a carrier and at least one conveyor section held at the carrier, with at least a part of the conveyor section being able to be tilted relative to the carrier between a conveying position and a safety position about an axis extending in the conveying direction.

The conveying installation in accordance with the invention satisfies higher safety demands than conveying plants known from the prior art due to the tiltability of the conveyor section about the axis extending in the conveying direction. It is in particular possible due to the tiltability that the conveyor section or a tiltable part of the conveyor section can evade a body part of an operator such as a hand or an arm if the body part is accidentally "in the way" of a movement of the conveyor section necessary for the proper operation of the installation, for example the initially named pivoting, i.e. if the body part moves into the movement region of the conveyor section due to a lack of attention of the operator. An injury to the operator is thus avoided by the invention.

The invention is particularly advantageous in conjunction with conveying apparatus which have a plurality of conveyors movable independently of one another and arranged in spatial proximity to one another, for example a plurality of conveyors disposed next to one another and each pivotable in the manner of a rocker for the distribution of incoming products. In ongoing operation, intermediate spaces or openings namely result between the individual conveyors in such situations which may induce an operator to put a hand in or through, and indeed above all when—as frequently the case in practice—the individual movements of the conveyors do not take place continuously, but only at times. Intermediate spaces or openings are then namely present which are only assumed to occur permanently, but which actually only occur temporarily, and which can close again on the next movement of one of the conveyors. It is particularly problematic that these discontinuous movement routines are frequently not foreseeable since they are dependent on numerous conditions which may change constantly. The tiltability of the conveyor section into a safety position provided in accordance with the invention can reliably avoid injuries particularly in such environments since the conveyor section can take evasive action due to its tiltability if it meets a resistance in the form of a body part which has accidentally moved into its range of movement.

Possible further developments and embodiments of the invention are also set forth in the dependent claims, in the description and in the drawings.

A retention installation is preferably provided which is active in the conveying position and which only releases a tilting of the conveyor section into the safety position on an exceeding of a critical load acting on the conveyor section. It is thereby achieved that the conveyor section is held in the conveying position during normal conveying operation and only tilts into the safety position in exceptional cases when the critical load is exceeded. In this respect, the critical load is advantageously selected so that it is exceeded when the conveyor section impacts a body part of an operator.

The retention installation is particularly preferably active between the conveyor section and the carrier. The retention installation can be kept compact in this manner and can be designed inexpensively. The retention installation can, for example, have at least one preloaded, in particular spherical, latching element which is arranged at the conveyor section and which engages into a mount in the conveying position which is provided at the carrier complementary to the latching element. The conveyor section is thereby held at the carrier. If the critical load is exceeded, the latching element moves against its preload out of engagement with the mount so that the conveyor section is released and a tilt into the safety position can take place.

The carrier can be arranged before the conveyor section viewed in the conveying direction so that the carrier and the conveyor section lie behind one another viewed in the conveying direction.

The conveyor section is preferably supported, in particular centrally, on an axial element defining the axis, in particular of bar shape and extending in the conveying direction and/or is carried by means of the axial element at the carrier. The tiltability of the conveyor section relative to the carrier can be achieved in a simple manner by use of the axial element for coupling the conveyor section to the carrier.

The conveyor section preferably includes at least one part section configured in plate form which can in particular form a table-like support surface or a substructure for a conveyor belt running above it or for a plurality of parallel conveyor bands of the conveyor running above it.

In accordance with a preferred further development of the invention, the conveyor section or a part section of the conveyor section can be tilted between the conveyor position and a further, second safety position about a second axis extending transversely to the conveying direction. A further evasion possibility for the conveyor section is thereby provided.

The conveyor section particularly preferably has at least two part sections lying after one another in the conveying direction, with the front part section, viewed in the conveying direction, being tiltable between the conveying position and the further second safety position about the second axis. The front part section, in particular lying further remote from the carrier, can thus not only tilt about the axis extending in the conveying direction, but also about the second axis extending transversely thereto. The front part section can thereby take evasive action, for example, if an operator intrudes into a region between the front part section and a downstream conveyor. It can thus be avoided that a hand or an arm of an operator is trapped between the front part section and the downstream conveyor.

It is expedient, but not compulsory, for the front part section to be tiltable about both axes. Provision can thus generally be made that the conveyor section has a plurality of part sections which are not all tiltable about the axis extending in the conveying direction, but rather at least one part section is only tiltable about the axis extending transversely to the conveying direction.

In the conveying position, a further, second retention installation can act between the two part sections which only releases a tilt of the front part section into the second safety position on the exceeding of a critical load acting on the front part section.

Provision can generally also be made independently of the above-explained embodiments with a multipart conveyor section that the individual parts can be adjusted and/or tilted independently of one another and relative to one another or relative to a carrier or a base between a conveying position and a safety position.

Provision is made in accordance with an embodiment that the conveyor section includes a revolving conveyor belt and/or revolving conveyor bands which in each case is or are not tilted, at least not as a whole, on a tilting of a part of a multipart conveyor section, but is or are arranged and/or configured such that the tilting of the part of the conveyor section is possible. In this respect, at least one deflection installation for the conveyor belt or for the conveyor bands can be provided, in particular behind the conveyor section viewed in the conveying direction, with the deflection installation preferably being fixed at the conveyor section. The axis about which the part can be tilted in particular extends between the upper run and the lower run of the conveyor belt or between the upper runs and the lower runs of the conveyor bands.

It is hereby achieved in a simple manner from a construction aspect that not all parts have to be tilted together with a multipart conveyor section.

Even if the conveyor section is tilted as a whole or if all the parts of a multiple conveyor section are tilted together, a conveyor belt or conveyor bands is or are advantageous with a corresponding arrangement and/or configuration since it is possible in this way only to provide one deflection at the conveyor section itself and to provide the other deflection at a base at which the conveyor section is attached and relative to which the tilting of the conveyor section takes place.

At least one deflection installation for the conveyor belt or for the conveyor bands is preferably provided behind the conveyor section viewed in the conveying direction.

The deflection installation is preferably fastened at the conveyor section, in particular at a front part of the conveyor section, viewed in the conveying direction. The deflection installation is therefore co-moved when the conveyor section or the front part of the conveyor section is tilted so that a conveyor belt running over the deflection installation or conveyor bands running over the deflection installation is or are also tilted.

In accordance with a preferred further development of the invention, the conveyor is configured to be attached to a base and to be pivoted relative to the base about a pivot axis extending transversely to the conveying direction. The conveyor can thus, for example, be attached to the base in the manner of a rocker serving for the distribution of incoming products to sequential outgoing conveyors arranged above one another.

The conveyor can preferably cooperate in dependence on the pivot position with one or more outgoing or ingoing conveyors arranged above one another for the transfer or taking over of products.

The conveyor can, for example, be arranged at the front end of an ingoing conveyor, viewed in the conveying direction, to supply products running in via the ingoing conveyor to one of the downstream outgoing conveyors in dependence on the pivot position of the conveyor. Conversely, the conveyor can also be arranged at the rear end of an outgoing conveyor, viewed in the conveying direction, to supply products to the outgoing conveyor which run in from one or more ingoing conveyors arranged above one another. The conveyor can thus be used as a type of switch.

The carrier is preferably configured for the pivotable attachment of the conveyor to the base.

A further deflection installation, in particular a driven deflection installation, can be provided at the base to be able to clamp a conveyor belt or a plurality of parallel conveyor bands between the above-mentioned first deflection installation of the conveyor section and the second deflection installation.

The invention also relates to a conveyor apparatus having a base and at least one conveying installation in accordance with the invention, with the conveyor of the conveying installation being attached to the base and being pivotable relative to the base about an axis extending transversely to the conveying direction.

In a preferred embodiment of the conveying apparatus, a plurality of conveyors are provided which are arranged next to one another at the base and can be pivoted in dependence on one another. For example, at least two ingoing conveyors can be provided which lie next to one another and downstream of which a respective conveyor is arranged which is pivotable in the manner of a rocker. Since every conveyor can be tilted into a safety position, the conveyors can take evasive action if an operator intrudes between the conveyors and the conveyors are pivoted relative to one another.

Figure 2:
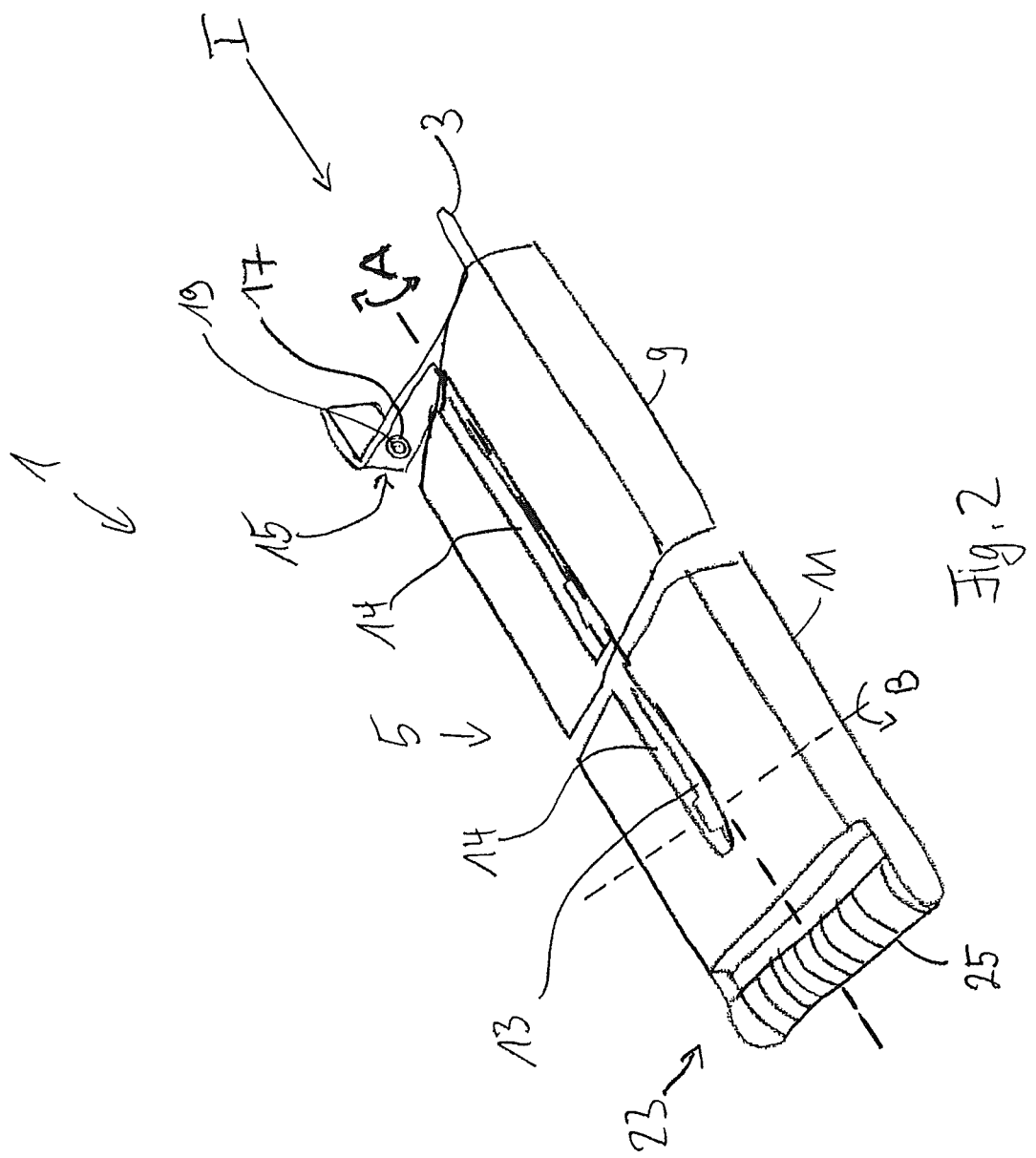
Figure 3:
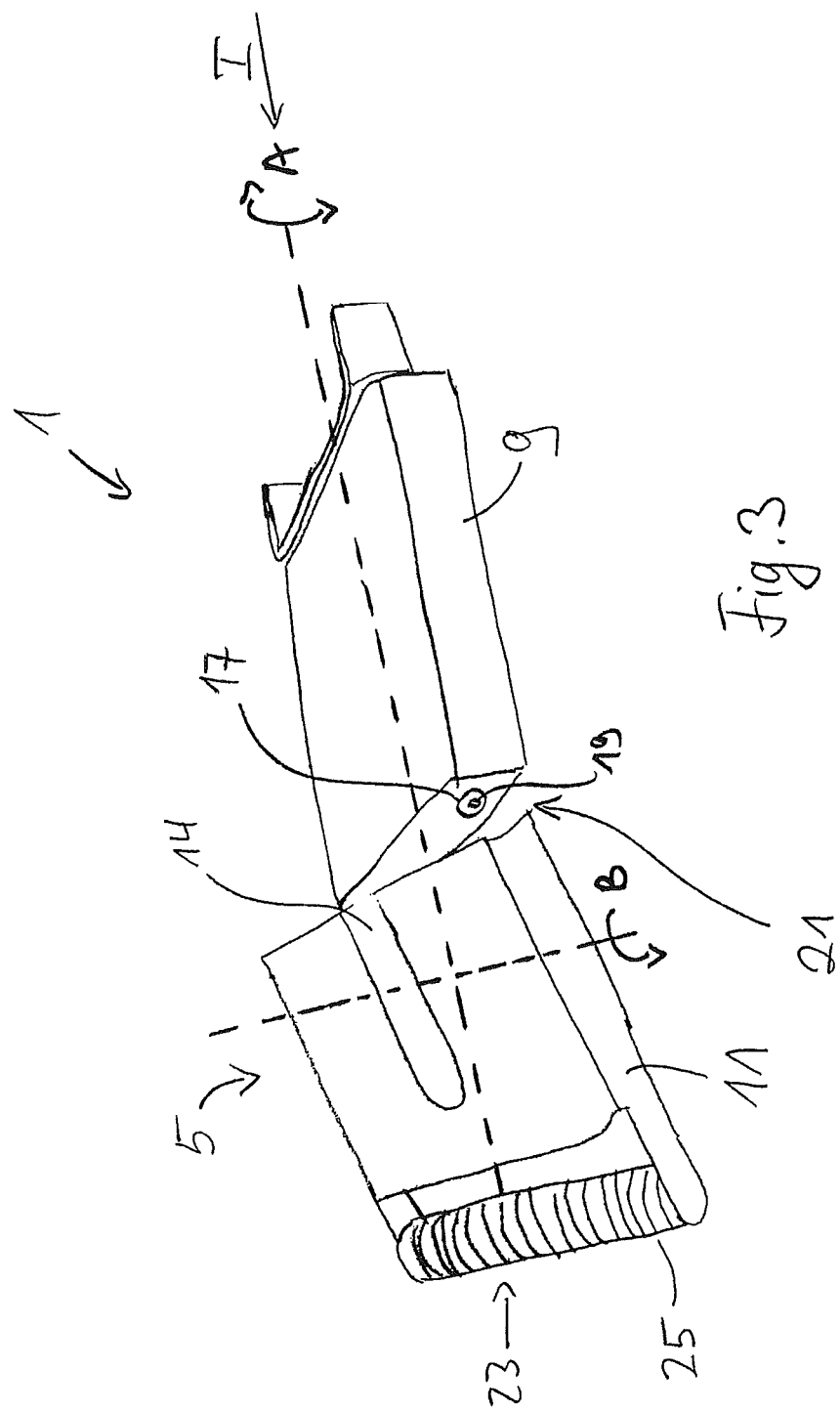
Figure 4:
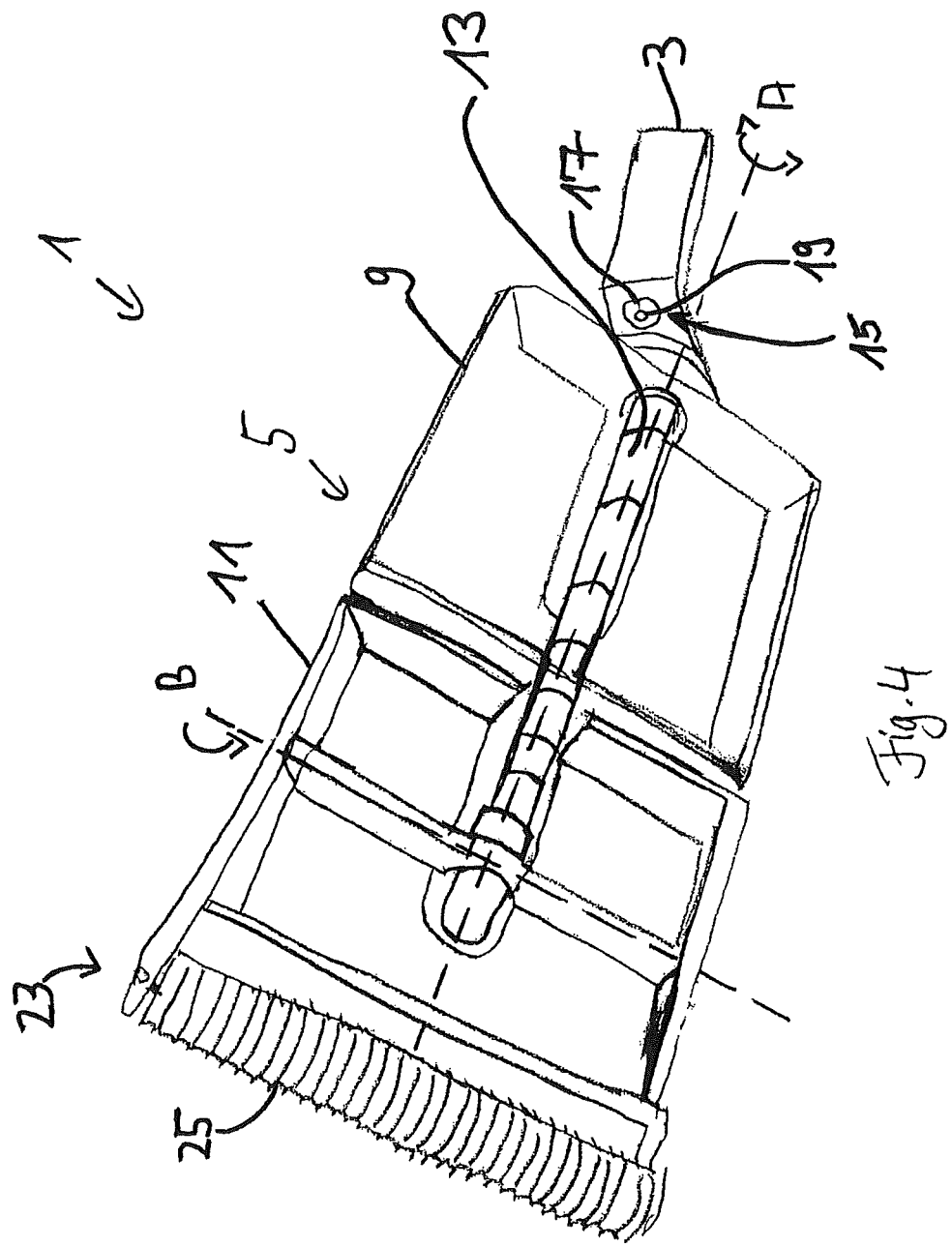
Figure 5:
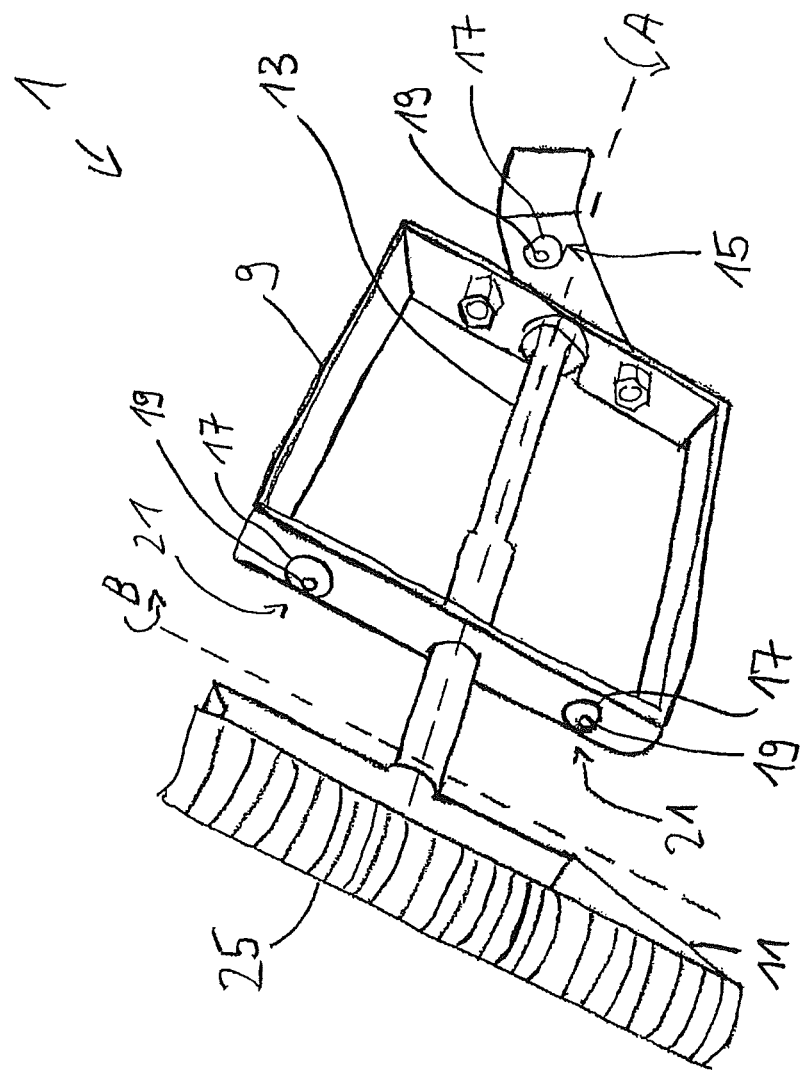
Figure 6:
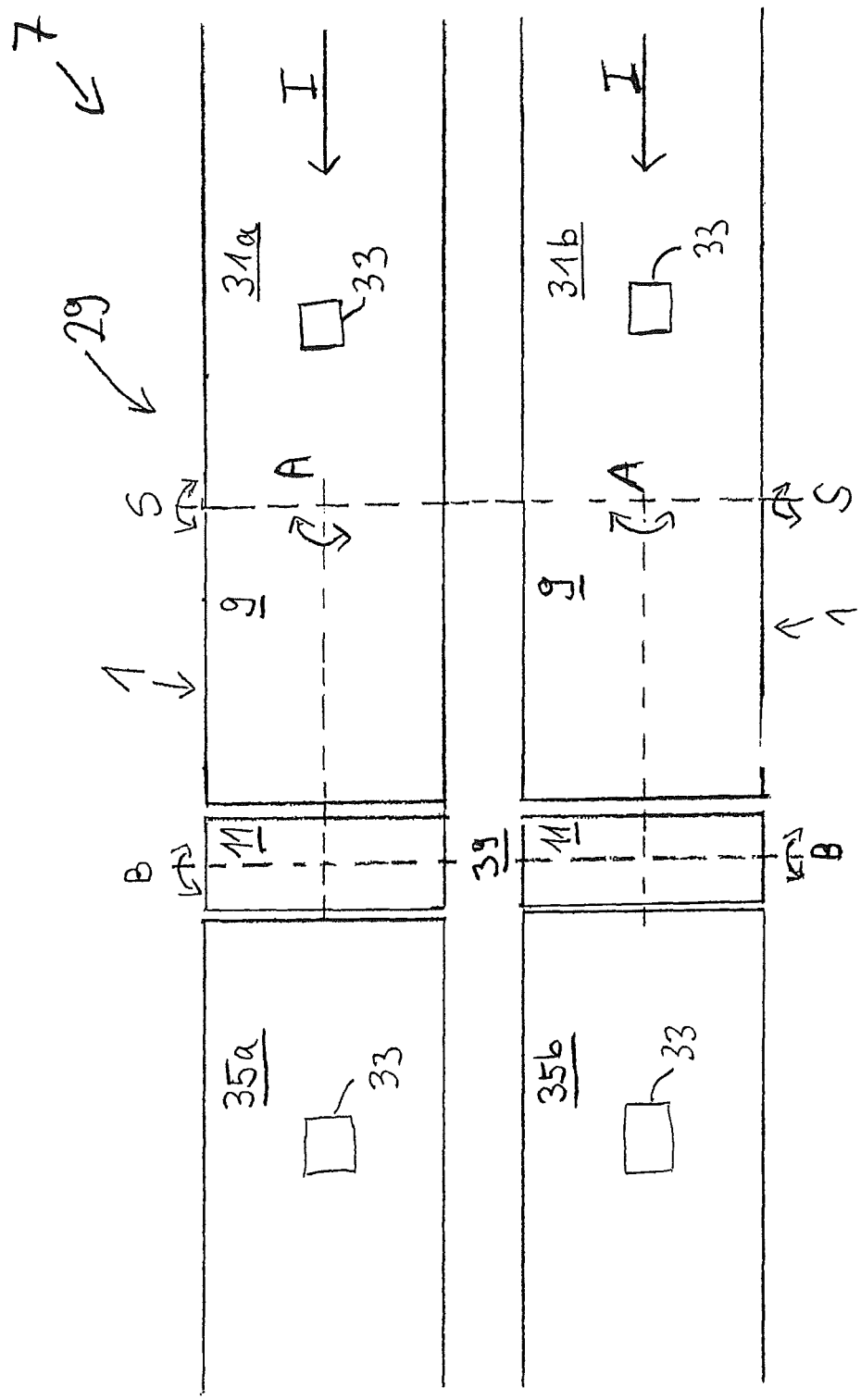

The invention will be explained in the following by way of example with reference to the enclosed drawings. There are shown, schematically in each case FIG. 1 a perspective representation of a conveyor in accordance with the invention whose conveyor section is located in a conveying position relative to a carrier of the conveyor;

FIG. 2 a further perspective representation of the conveyor of FIG. 1 in which the conveyor section is located in a safety position relative to the carrier;

FIG. 3 a further perspective representation of the conveyor of FIG. 1, wherein a front part section, viewed in the conveying direction, of the conveyor section adopts a safety position relative to a rear part section;

FIG. 4 a perspective representation of the lower side of the conveyor of FIG. 1 in which the conveyor section is located in a safety position relative to the carrier;

FIG. 5 a further perspective representation of the lower side of the conveyor of FIG. 1, wherein the front part section, viewed in the conveying direction, of the conveyor section adopts a safety position relative to the rear part section and the rear part sections adopts a safety position relative to the carrier;

FIG. 6 a plan view of a conveying apparatus in accordance with the invention; and FIG. 7 a lateral view of the conveying apparatus of FIG. 6.

The conveyor 1 of an installation In accordance with the invention shown in FIGS. 1 to 5 for the conveying of products, for example slices or portions, which come from a highperformance slicer for slicing food products includes a carrier 3 and a conveyor section 5 held at the carrier 3.

In the conveyor 1, the carrier 3 and the conveyor section 5 are arranged behind one another along the conveying direction I, i.e. the carrier 3 lies in front of the conveyor section 5 viewed in the conveying direction I. The conveyor section 5 of the conveyor 1 has two part sections 9 and 11 which are configured in plate form and have an approximately rectangular upper side. The two part sections 9 and 11 are movably supported on a bar-shaped axial element 13 (cf. FIG. 4) which extends centrally beneath the two part sections 9, 11 in the conveyor direction I. The two part sections 9, 11 are held at the carrier 3 by means of the axial element 13. Each part section 9, 11 moreover has an elongate central cut-out 14 (cf. FIG. 1).

The conveyor section 5 or the two part sections 9, 11 can adopt a conveying position relative to the carrier 3 such as is shown in FIG. 1. In addition, the part sections 9, 11 can carry out a rotational movement about the axial element 13 and can thereby move into a safety position, as is shown in FIG. 2. In the conveyor 1, the conveyor section 5 is thus tiltable relative the carrier 3 between the conveying position and the safety position about an axis A defined by an axial element 13 extending in the conveying direction I. The two part sections 9, 11 can tilt together about the axis A, but can also be tilted about the axis A independently of one another.

In this respect, a retention installation 15 acts between the rear part section 9 and the carrier 3 (cf. FIGS. 2 and 4) which only releases a tilting into the safety position on an exceeding of a critical load. The retention installation 15 includes two elevated portions 17 which are each arranged laterally offset from the axis A at the carrier 3 and each have a depression 19 in their centers. Two spherical latching elements (not shown) which are preloaded against the conveying direction I are arranged at the side of the part section 9 which is opposite the carrier 3. In this respect, the latching elements engage in each case in one of the depressions 19 in the conveying position, whereby the part section 9 is held in the conveying position (cf. FIG. 1). The preload acting on the latching elements is selected so that the latching elements are urged out of the depressions 19 when the part section 9 is loaded beyond the critical load. The conveyor section 5 can then tilt as a whole relative to the carrier 3 about the axis A and can move into the safety position (cf. FIG. 2).

A further, second retention installation 21 is provided between the rear part section 9 and the front part section 11 and is configured in the same manner as the first retention installation 15. The front part section 11 is held in the conveying position by the second retention installation 21.

The front part section 11 is furthermore tiltable relative to the rear part section 9 about a second axis B extending transversely to the conveying direction I so that the front end 23 of the front part section 11 can pivot downwardly relative to the rear part section 9 when a critical load on the rear part section 11 is exceeded (cf. FIG. 5).

As FIG. 3 shows, the front part section 11 can also be tilted simultaneously about both axes A, B relative to the rear part section 9 if, for example, a front corner region of the front part section 11 is loaded and the critical load is exceeded.

A deflection installation 25 by means of which conveyer bands 27 arranged offset from one another over the total width of the conveyor 1 and extending in the conveying direction I are deflected is attached to the front end 23 of the front part section 11.

The above-described conveying installation is used in the conveying apparatus 7 of FIGS. 6 and 7 in which two conveyors 1 arranged next to one another are used.

In this respect, the conveying apparatus 7 has a base 29 which is formed by two parallel ingoing conveyors 31a, 31b which are, for example, arranged downstream of a slicing machine (not shown) for slicing foods and transport products 33 coming from the slicing machine in the conveying direction I. One of the conveyors 1 is arranged downstream of each ingoing conveyor 31a, 31b to transport on the products 33 running in from the respective ingoing conveyor 31a, 31b. In this respect, each conveyor 1 is arranged in the manner of a rocker at the respective ingoing conveyor 31a, 31b so that each conveyor 1 can be pivoted about a pivot axis S extending transversely to the conveying direction I.

A respective outgoing conveyor 35a, 35b is arranged downstream of the two conveyors 1. Each outgoing conveyor pair 35a, 35b has two outgoing conveyors arranged above one another, and indeed an upper outgoing conveyor 37a in a plane E1 and a lower outgoing conveyor 37b in a plane E2 disposed thereunder (FIG. 7).

FIG. 7 shows a situation by way of example in which a conveyor 1 is pivoted upwardly to its upper outgoing conveyor 37a and the other conveyor 1 arranged beside it is pivoted downwardly to its lower outgoing conveyor 37b. The products 33 can then be supplied via the respective outgoing conveyor 37a, 37b to an installation (not shown) arranged downstream of the respective outgoing conveyor 37a, 37b, for instance to a further conveying installation, to a robot unit or to a packaging machine.

As is mentioned above, the part sections 9, 11 of the respective conveyor 1 adopt a conveying position in which they are held by the retention installations 15, 21. The part sections 9, 11 of the conveyors 1 arranged next to one another can tilt about the respective axis A extending in the conveying direction I on an exceeding of a critical load acting on the part sections 9, 11. It can thereby be avoided that an operator is injured who intrudes between the two conveyors 1 pivotable independently of one another.

Since the front part section 11 of each conveyor 1 is additionally tiltable about the axis B extending transversely to the conveying direction I, the front part section 11 can also take evasive action independently of the rear part section 9 if the operator intrudes into the region between the respective outgoing conveyor 37a or 37b just controlled, as is shown for the example of the upwardly pivoted conveyor 1 in FIG. 7, whose front section 11 tilted about the axis B into the safety position is indicated by dashed lines.

The invention claimed is:

1. An installation for conveying products (33) coming from a slicing machine for food products, having
    at least one conveyor (1) that includes a carrier (3) and at least one conveyor section (5) that includes a rear part section (9) and a front part section (11) held at the carrier (3),
    wherein each of the rear part section (9) and the front part section (11) are separately tiltable relative to the carrier (3) between a conveying position and a safety position about an axis (A) extending in the conveying direction (I).

2. An installation in accordance with claim 1, wherein the products are one of product slices and product portions.

3. An installation in accordance with claim 1, wherein a retention device (15) active in the conveying position is provided which only releases a tilting of the conveyor section (5) into the safety position on an exceeding of a critical load acting on the conveying section (5).

4. An installation in accordance with claim 3, wherein the retention device (15) is active between the conveying section (5) and the carrier (3).

5. An installation in accordance with claim 1, wherein the carrier (3) is arranged in front of the conveyor section (5) viewed in the conveying direction (I).

6. An installation in accordance with claim 5, wherein the carrier is formed as a hoop.

7. An installation in accordance with claim 6, wherein the hoop is a U-shaped hoop.

8. An installation in accordance with claim 1, wherein the conveyor section (5) is supported on an axial element (13) defining the axis (A) and/or is carried at the carrier (3) by means of the axial element (13).

9. An installation in accordance with claim 8, wherein the conveyor section (5) is centrally supported on an axial element (13).

10. An installation in accordance with claim 1, wherein the front part section (11) of the conveyor section (5) is tiltable between the conveying position and a further, second safety position about a second axis (B) extending transversely to the conveying direction (I) and the axis (A).

11. An installation in accordance with claim 10, wherein the rear part section (9) and the front part section (11) lie behind one another in the conveying direction (I), with the front part section (11) viewed in the conveying direction (I) being tiltable between the conveying position and the further, second safety position about the second axis (B).

12. An installation in accordance with claim 11, wherein a further, second retention device (21) is active between the rear part section (9) and the front part section (11) in the conveying position, with the second retention device (21) only releasing a tilting of the front part section (11) into the second safety position on an exceeding of a critical load acting on the rear part section (11).

13. An installation in accordance with claim 1, wherein the conveyor section (5) includes conveyor bands (27) that revolve or are not tilted or are at least not tilted as a whole on a tilting of at least one of the rear part section (9) and the front part section (11) of the conveyor section (5).

14. An installation in accordance with claim 1, wherein the conveyor (1) is configured to be attached to a base (29) and to be pivoted relative to the base (29) about a pivot axis (S) extending transversely to the conveying direction (I).

15. An installation in accordance with claim 14, wherein the conveyor (1) is configured to cooperate with one of a plurality of outgoing or ingoing conveyors (31a, 31b, 37a, 37b) arranged above one another to transfer or take over products (33) in dependence on the pivot position.

16. An installation in accordance with claim 10, wherein the carrier (3) is configured for the pivotable attachment of the conveyor (1) to the base (29).

17. An installation in accordance with claim 14, wherein a conveyor belt which revolves or conveyor bands (27) which revolve are clamped between the base (29) and a deflection device (25).

18. An installation in accordance with claim 17, wherein a clamping apparatus is provided by means of which the tensile stress in the conveyor belt or in the conveyor bands (27) can be varied.

19. A conveying apparatus having a base (29) and at least one conveying installation for conveying products (33) coming from a slicing machine for food products, having at least one conveyor (1) which includes a carrier (3) and at least one conveyor section (5) that includes a rear part section (9) and a front part section (11) held at the carrier (3), wherein each of the rear part section (9) and the front part section (11) are tiltable relative to the carrier (3) between a conveying position and a safety position about an axis (A) extending in the conveying direction (I), and the front part section (11) is tiltable relative to the rear part section (9) about a second axis (B) extending transversely to the conveying direction (I), wherein the conveyor (1) is attached to a base (29) and is pivotable at least partly relative to the base (29) about an axis (S) extending transversely to the conveying direction (I).

20. A conveying apparatus in accordance with claim 19, wherein the conveying device includes a plurality of conveyors (11) which are arranged next to one another at the base (29) and are pivotable independently of one another.

* * * * *